March 28, 1967 E. GOSSNER 3,311,745
CONTROLLED BEAM HEADLAMP AND THE LIKE
Filed March 19, 1964 2 Sheets-Sheet 2

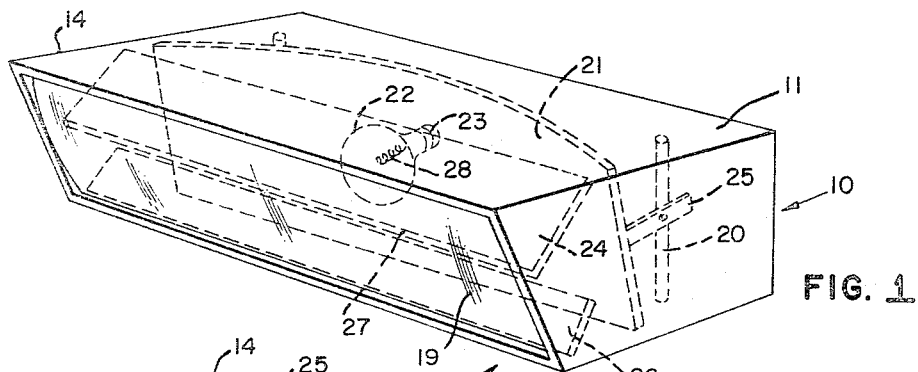
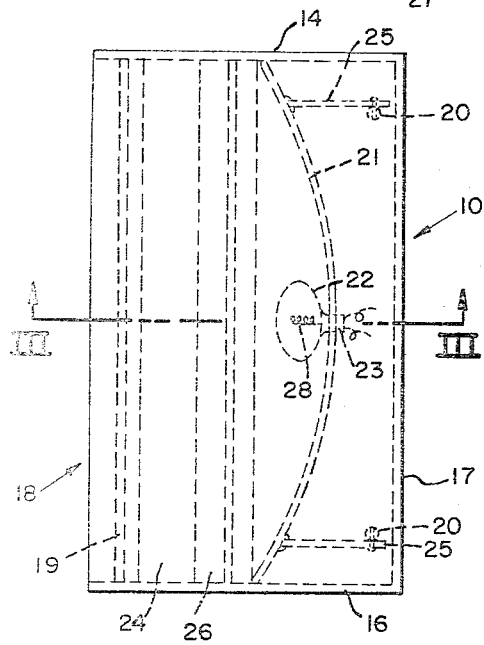
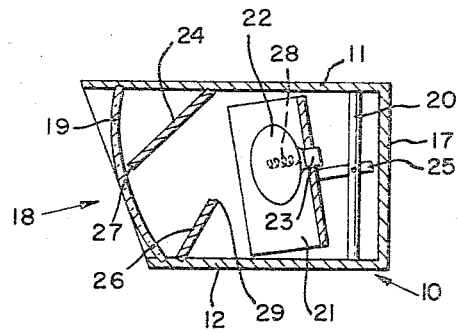
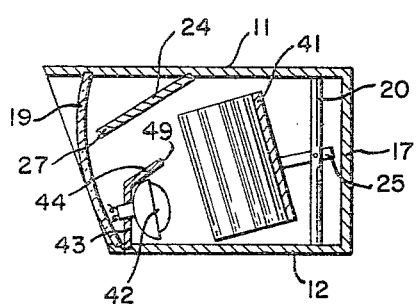

INVENTOR.
ELWIN GOSSNER
BY
ATTORNEY

United States Patent Office 3,311,745
Patented Mar. 28, 1967

3,311,745
CONTROLLED BEAM HEADLAMP
AND THE LIKE
Elwin Gossner, 341 1st St. W., Sonoma, Calif. 95476
Filed Mar. 19, 1964, Ser. No. 353,067
11 Claims. (Cl. 240—41.1)

This invention relates to light controlling devices which minimize glare from headlights, outdoor illuminating lamps and the like. More specifically this invention relates to such devices in which the angular spread of a beam (or beams) of light is reduced by positive structure defining the shape of beam desired, rather than focusing methods such as those utilizing parabolic reflectors.

This invention provides structure which projects light from one or more light sources in the form of a uniform beam with well defined edges of any shape desired. This is accomplished by a housing defining an opening and having a shape somewhat larger than that desired for the beam cross sectional dimensions. One or more light sources are disposed within the housing behind the opening thereof. A reflector shaped to uniformly distribute and/or collimate the light across the width of the opening is disposed behind the light source with respect to the opening. Louvers across the opening further define the shape of the beam and the direction thereof. Variants are provided by the positioning of the light source, by the shape of the reflector, and by the shape and tilt of the louvers.

An advantage of the invention is that the beam intensity tends to be spread uniformly across the entire cross sectional width of the beam to provide constant illumination of a particular area. This is particularly advantageous for automobiles since the center and both sides of the roadway are illuminated to the same extent, removing the guess work of identifying objects in the shadows of the road shoulders. In indoor industrial lighting a whole area may also be lighted uniformly without "dark" spots" or shading or lessened light intensity toward the edges.

Another advantage of the invention is that the beam may be shaped to any size or contour merely by shaping the housing, reflector and louvers. In an automobile, for example, the housing may be relatively wide and narrow to fit across the front of the automobile to take the place of a plurality of focused sealed beam lights as now used; such a shape would result in a beam substantially as wide or wider than the road. Other contours could be equally easily devised for a particular operation either indoors or outdoors.

Another advantage is that the beam edge tends to be sharply defined, with resulting lessening of side glare from positions ahead of but not within the actual beam edge. For automobiles this means that the beam height as well as the beam width is controlled, so that glare to oncoming vehicles is averted beyond the range of the headlights. In industrial use, such as oil well drilling, accidents may be minimized by elimination of glare from over-throwing lights. In fog and wet weather, too, glare is minimized by elimination of scattered light at side angles to the main beam of light. Also, the halo which appears in a driver's view from the glare of headlights presently in use is eliminated.

A further advantage is that the device can be adjusted to achieve maximum beam reach with different vehicle heights and different sizes and number of lights.

Another advantage is that a plurality of light sources may be used, either singly or in combination in the same device to effectively increase the illumination of a given area. The multiple light source arrangement also reduces the likelihood of any one unit being dead by failure.

A further advantage is that the device, being ordinarily closed by a front lens, is relatively gas proof and hence is safe for use in mines. It is also to be understood that the light source and the reflector may be a single sealed unit as well. The device also eliminates the need for built-in dimming devices on automobiles; oncoming motorists are protected at all times.

Accordingly, an object of the invention is to provide a light controlling device minimizing glare from headlamps, outdoor illuminating lamps and the like, wherein the louvers controlling the upper limits of the beam are below the horizontal line of the light source.

Another object of the invention is to provide structure producing a projected beam of light with constant illumination across its width and with sharply defined edges.

A further object of the invention is to provide structure producing a beam of light seen only within the limits of the louvers within the housing.

Another object of the invention is to provide structure producing a beam of light for projection onto a distant surface area in which the edge of the beam is sharply defined by positive structural features.

Another object of the invention is to provide structure for projecting a beam of light which spreads light produced by one or more light sources over the entire area of the beam so that the illumination therein is constant and without glare.

Further objects are to provide a construction of maximum simplicity, economy and ease of assembly and disassembly, also such further objects, advantages and capabilities as will fully appear and as are inherently possessed by the device and invention described herein.

The invention further resides in the combination, construction and arrangement of parts illustrated in the accompanying drawings, and while there is shown therein a preferred embodiment thereof, it is to be understood that the same is illustrative of the invention and that the invention is capable of modification and change and comprehends other details of construction without departing from the spirit thereof or the scope of the appended claims.

In the drawings:

FIGURE 1 is a perspective view of an automobile headlight unit utilizing controlled beam illumination;

FIGURE 2 is a top plan view schematically showing the arrangement of the parts in FIGURE 1;

FIGURE 3 is a vertical cross-section taken on the line III—III of FIGURE 2;

FIGURE 4 is a schematic vertical section showing a variant form of the lighting location and lower louver as well as a serpentine reflector;

Figure 5:
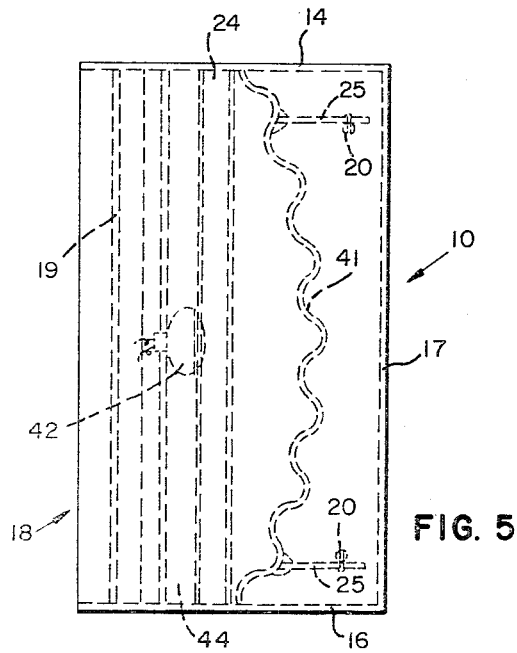
FIGURE 5 is a schematic top plan view of the form shown in FIGURE 4.

Referring now to the drawings in which like numerals indicate like parts in the several views, and particularly to FIGURES 1 to 3, there is shown a preferred embodiment of the light control device 10 suitable for use as an automobile headlight and the like. The device 10 is enclosed in an outer housing, generally deeper than high, consisting of a top 11, bottom 12, sides 14 and 16 and a back 17. The front 18 is open and is usually covered by a lens 19. The top 11 of the housing is somewhat deeper than bottom 12 and overhangs the bottom along the front edge.

Toward the back of device 10 within the housing there is disposed a horizontally curved reflector 21 having a front surface which is capable of reflecting a high percentage of all light incident thereupon. The reflector 21 may be held in place by any convenient means. As shown, it is supported on vertical posts 20 and arms 25 which are adjustable vertically and horizontally with respect to each other so that any degree of adjustment may be made. At a central point in front of the reflecting surface a light source 22 is held rigidly in position, as for example, by a socket 23 extending through the reflector 21. The light source is connected to a suitable source of energy (not shown) and may be energized at the will of the operator. Customarily, the controls would be on the dashboard of an automobile, or other unit of which the device 10 would be a part.

In front of the light source 22 with respect to the opening 18 there are positioned upper and lower louvers 24 and 26 which extend laterally across the opening. These are mounted in any convenient way and may be mounted for adjustment of vertical angularity in a conventional manner, if desired. The upper louver 24 is tilted or slanted downwardly and outwardly with respect to opening 18 and is positioned with lower horizontal edge 27 below a center line extending through the center 28 of the light source 22. The lower louver 26 is angled upwardly and inwardly from opening 18, and has its upper horizontal edge 29 positioned below and spaced inwardly from the lower edge 27.

In the operation of the device 10, light from the light source 22 is propagated in all directions once it is energized. By virtue of the curved surface of the reflector 21 the light falling thereupon tends to be reflected forwardly along each incremental distance from the center 28 of the light source so that light is reflected outwardly over the entire surface thereof. In addition, a portion of the light emitted from the source will pass directly outwardly without being reflected. In this manner a wide beam of equal intensity is formed and projected outwardly and downwardly. The width of the beam gives coverage over a wide area, and yet one looking directly into the device 10 will not face any glare because of the edge 27 of the upper louver 24 shielding the direct glare of the light source 22.

As is apparent, the beam of light from the device 10 is restricted or controlled by upper and lower louvers 24 and 26. Since the light projected outwardly from the reflector 21 and light source 22 tends to be collimated or unidirectional, it tends to strike the louvers at a given angle rather than at varied angles. The louvers therefore cut the light off sharply along their respective edges 27 and 29 and only that light is projected as a beam which passes both below the upper edge 27 and above the lower edge 29, to form a beam the full width of device 10. The light which does strike the inner surface of the lower louver at an upward angle is still not free to project upwardy as it passes the edge 29 for the reason that upward louver 24 is outwardly from lower louver 26 and will serve to stop such light.

A small amount of light is reflected from the backs of the louvers and from the top and bottom of the housing. Since the lower louver 26 is tilted inwardly, any light reflected therefrom is thrown back toward reflector 21 where it may be again reflected outwardly or at least does not pass around lower louver 26 at an angle which will cause glare. If desired, the sides of the louvers facing the light source 22 may be provided with non-reflecting surfaces to cut down on spurious light emission around the edges of the louvers.

In adapting the embodiment of FIGURES 1 to 3 to automotive uses, the upper louver should be positioned so that light will be projected for the effective distance which the light is able to provide assistance to the driver, yet low enough that it will not be thrown into the eyes of the oncoming cars or pedestrians. This position will vary with the height of the automobile, the positioning of the device on the automobile and the positions of the reflector and light source. The lower louver should be positioned to cast a beam a short distance in advance of the vehicle. When the device 10 of the invention is adapted to other illumination purposes, the individual dimensions and positions of the louvers are varied according to the purpose of the embodiment.

It is not intended that the scope of the invention be restricted to the precise preferred embodiment, but may include any and all such modifications and variants within the scope of the claims. The housing, for example, need not be rectangular, but may assume such shape as will be adaptable to individual purposes. While small variations may be made, it is preferred, however, that the reflector 21 be substantially the same lateral width as the opening 18. This enables the reflector to produce a beam of uniform intensity unlike an ordinary sealed beam headlamp. The louvers may also be curved or shaped to any form suitable for the intended end use. The edges of the louvers, for example, may be shaped to a particular contour which is to be lighted. This is true so long as the lower edge 27 of the upper louver 24 is below the horizontal plane of the light source.

Since the device 10 does not focus the light emitted, but spreads it over a considerable area, it may be necessary to use a light source with a high power output where the area of the beam projection is to be large. Alternatively, a number of light source units may be used, in which instance it is preferred that they be grouped together at the center of the reflector. Here again care should be exercised to keep the lower edge 27 of the louver 24 below the horizontal plane of the lowest light source.

Another preferred embodiment is shown in FIGURES 4 and 5. Instead of being curved the reflector 41 consists of a planar member having reflecting vertical corrugations. Reflector 41 should be deep enough within the housing to avoid the scattering of light at a wide angle along the sides. Light source 32, instead of being positioned against the reflecting surface, is faced in the opposite direction and spaced therefrom and positioned on the inside of lower louver 43 having inwardly turned lip 44 which prevents the direct passage of light between the louvers. In operation, light emitted by the light source 42 travels directly to each of the corrugations where it is reflected outwardly over a wide angle. Since the amount of light received by each corrugation will be nearly uniform, each corrugation will act to independently relay or reflect an equal amount of light in the forward angles, and a beam of uniform illumination will thereby be produced.

In the embodiment of FIGURES 4 and 5, the light 42 may be either a reflecting bulb or a conventional sealed beam light unit with a light bulb encased within a reflecting housing. Preferably the reflecting surface 41 should not focus the light. In this manner light is not wasted on the back side of the lower louver 43 but is entirely projected toward the parallel corrugations. Here again, the placement of the light source makes it impossible to see the light emitting portion of the light source through the opening between edges 27 and 29.

Figure 6:
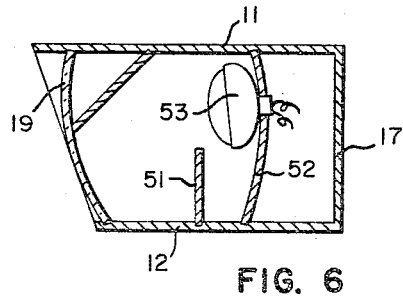
FIGURE 6 shows a vertical lower louver.

In FIGURE 6 there is shown a lower louver 51 which is positioned in a vertical position and a reflector 52 which is curved inwardly from top to bottom and slanted in a slight backward tilt. In this embodiment an electric light bulb 53 is disposed in the upper central portion of the reflector. The bulb 53 is preferably a wide angle reflector, i.e., shaped to reflect light forwardly over a wide angle when painted on the rearward side with a reflecting paint. An ordinary electric light bulb within a secondary wide angle reflector also suffices. In operation, the direct rays of light are projected between the louvers as before. In addition, a small amount of light is scattered or reflected back to reflector 52 and then reflected forward, also passing through the louvers. Lower louver 51 limits the lower angle of the beam as before. However, the vertical positioning of the louver in addition to the curved reflector enables light trapped behind the louver to be reflected upwardly and projected outwardly.

Figure 7:
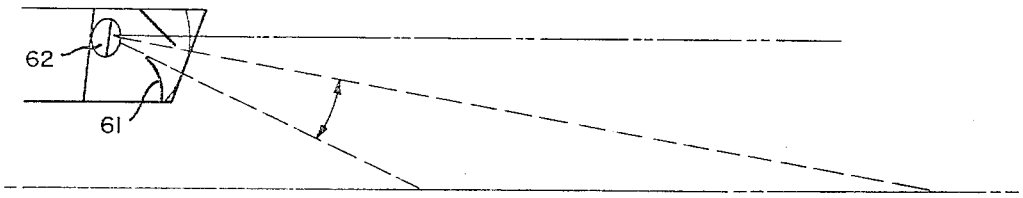
FIGURE 7 is a side schematic view showing the illuminating beam with respect to the horizontal using a curved lower louver.
Figure 8:
FIGURE 8 is a schematic side elevational view of the illuminating beam using a vertical louver.
Figure 9:
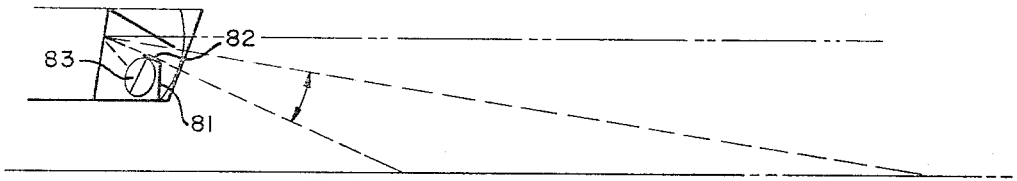
FIGURE 9 is a side elevational schematic view of the illuminating beam produced by the illumination of the form shown in FIGURE 4.

In FIGURES 7 to 9, the effect of the location and shape of the lower louver upon the angle of inclusion of the resulting beam of light is shown. In FIGURE 7 the lower louver 61 curves inwardly so that the upper edge is nearly tangential with respect to the light from bulb 62. In FIGURE 8 the lower louver 71 is vertical, while the reflector 72 is curved from top to bottom and tilted backwardly. In FIGURE 9 the lower louver 81 is vertical with an inward lip 82 and light 83 is positioned behind the louver 81 and beneath the lip 82. In each instance the upper angular limit of the beam of light from the horizontal is determined by the positioning of the upper louver, since the louver effectively prevents light from passing above its lower edge. The lower angular limit of the beam of light from the horizontal is determined by the positioning of the upper edge, regardless of the shape or kind of louver.

I claim:
1. In a light controlling device minimizing glare from headlamps, outdoor illuminating lamps and the like, in combination a relatively shallow lamp housing defining an opening which is wider than the depth thereof and having depth sufficient to restrict the horizontal angle of light emitted from a light source therein, a light source disposed within said housnig at a point rearwardly of said opening, a reflector in back of said light source relative to said opening, a vertically curved glass in said opening, an upper louver positioned horizontally and angled downwardly and outwardly across said opening but inside said curved glass to prevent the direct passage of light above a designated angle below the horizontal, and a lower louver positioned horizontally across said opening also inside said curved glass to prevent passage of light at a designated angle below the horizontal, and to permit only the passage of light in a wide flat shaft angled downwardly.

2. In a light control device minimizing glare from headlamps, outdoor illuminating lamps and the like, in combination a generally rectangular housing open at one side and deep enough to restrict the horizontal angle of light emitted by a light source therein, at least one light source disposed within said housing rearwardly of said opening, a generally rectangular laterally curved reflector rearwardly of said light source relative to said opening, an upper louver positioned across said opening preventing the passage of light above its lower horizontal edge, said edge being positioned at a designated angle below the horizontal center line of the light source, and a lower louver across said opening preventing passage of light below its upper edge, said edge being positioned at a designated angle below the said horizontal center line.

3. The light control device of claim 2 in which the open end in said housing has an upper lip extending beyond the structure defining the lower portion of said opening.

4. The light control device of claim 2 in which said reflector is mounted within said housing for angular and horizontal adjustment.

5. The light control device of claim 2 in which a plurality of light sources are used within a single housing.

6. The light control device of claim 2 in which said light source is further encased within a secondary reflector tending to focus the beam of light in a single direction.

7. The light control device of claim 2 in which said light source is encased within a secondary reflector focusing light emitted upon said laterally curved reflector.

8. The light control device of claim 2 in which said reflector is a curved vertically fluted surface.

9. In a light control device minimizing glare from headlamps, outdoor illuminating lamps and the like, in combination a housing open at one side, at least one light source disposed within said housing at a point rearwardly of said side opening, a laterally curved reflector in said housing rearwardly of said light source, an upper louver inclined outwardly along the upper portion of said side opening, the lower edge of said louver being further positioned below the horizontal center line of said light source to prevent passage of light above a designated angle from the horizontal, and a lower louver across the lower portion of said opening and inwardly from said lower edge of said upper louver, but spaced from the lower edge of said upper louver.

10. The light control device of claim 9 in which said curved reflector is vertically fluted.

11. The light control device of claim 9 in which said curved reflector is mounted in the housing for angular and forward adjustment.

References Cited by the Examiner
UNITED STATES PATENTS

| | | | |
|---|---|---|---|
| 1,186,582 | 6/1916 | Jones | 240—46.31 X |
| 1,191,650 | 7/1916 | Baumgarten | 240—44.1 |
| 1,362,395 | 12/1920 | Clarke | 240—46.35 |
| 1,793,200 | 2/1931 | Walthers | 240—41.35 |
| 1,798,083 | 3/1931 | Halbach | 240—41.1 X |
| 2,024,084 | 12/1935 | Aldinger | 240—41.35 |

NORTON ANSHER, *Primary Examiner.*

C. C. LOGAN, *Assistant Examiner.*